(12) United States Patent
Sutardja et al.

(10) Patent No.: US 9,804,736 B2
(45) Date of Patent: Oct. 31, 2017

(54) MODIFIABLE CONTEXTUAL HELP CONTENT PROVIDED IN-LINE WITHIN AN APPLICATION

(71) Applicant: MARVELL WORLD TRADE LTD., St. Michael (BB)

(72) Inventors: Pantas Sutardja, Los Gatos, CA (US); Rick Chang, Dublin, CA (US); Haiping Shao, Cupertino, CA (US); Robin Yuk-Bun Chan, Sunnyvale, CA (US)

(73) Assignee: MARVELL WORLD TRADE LTD. (BM)

( * ) Notice: Subject to any disclaimer, the term of this patent is extended or adjusted under 35 U.S.C. 154(b) by 256 days.

(21) Appl. No.: 14/028,586

(22) Filed: Sep. 17, 2013

(65) Prior Publication Data

US 2014/0082492 A1    Mar. 20, 2014

Related U.S. Application Data

(60) Provisional application No. 61/702,563, filed on Sep. 18, 2012.

(51) Int. Cl.
*G06F 3/0481* (2013.01)

(52) U.S. Cl.
CPC ........ *G06F 3/04817* (2013.01); *G06F 3/0481* (2013.01)

(58) Field of Classification Search
CPC ..... G06F 3/048; G06F 3/0481; G06F 3/04817

USPC .......................................................... 715/708
See application file for complete search history.

(56) References Cited

U.S. PATENT DOCUMENTS

| | | | |
|---|---|---|---|
| 2002/0126140 A1* | 9/2002 | Gorbet et al. ................. 345/708 |
| 2004/0267798 A1* | 12/2004 | Chatterjee ............. G06F 17/241 |
| 2006/0101077 A1* | 5/2006 | Warner et al. ............. 707/104.1 |
| 2008/0126952 A1* | 5/2008 | Shohfi et al. ................. 715/752 |
| 2008/0147677 A1* | 6/2008 | Nishino ................ G06F 17/241 |
| 2009/0094525 A1* | 4/2009 | Coelius .................. G06Q 30/00 715/741 |
| 2012/0131032 A1* | 5/2012 | Rakshit ............. G06F 17/30873 707/767 |
| 2014/0032616 A1* | 1/2014 | Nack ............................. 707/805 |
| 2014/0101691 A1* | 4/2014 | Sinha .................. G06F 17/3082 725/32 |

* cited by examiner

*Primary Examiner* — Jennifer To
*Assistant Examiner* — Ashley Fortino

(57) ABSTRACT

Systems, methods, and other embodiments associated with providing contextual content along with elements within an application are described. According to one embodiment, an apparatus includes icon logic configured to generate, in response to detecting a selection of a page element, an icon that indicates whether contextual content associated with the page element is available. The page element is a display element of a graphical user interface (GUI) for an application. The apparatus includes context logic configured to generate a context panel in response to detecting an input associated with the icon. The context logic is configured to generate the context panel with a first tab and a second tab. The first tab includes a description of the page element and the second tab includes a set of comments from users about the page element.

18 Claims, 6 Drawing Sheets

310

320

330

340

MODIFIABLE CONTEXTUAL HELP CONTENT PROVIDED IN-LINE WITHIN AN APPLICATION

CROSS REFERENCE TO RELATED APPLICATIONS

This patent disclosure claims the benefit of U.S. provisional application Ser. No. 61/702,563 filed on Sep. 18, 2012, which is hereby wholly incorporated by reference.

COPYRIGHT NOTICE

A portion of the disclosure of this patent document contains material subject to copyright protection. The copyright owner has no objection to the facsimile reproduction of the patent document or the patent disclosure as it appears in the Patent and Trademark Office patent file or records, but otherwise reserves all copyright rights whatsoever.

BACKGROUND

The background description provided herein is for the purpose of generally presenting the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

Users often have difficulty adapting to new and/or technically complex computer applications. Typically, unfamiliar elements such as vocabulary, controls, and other complex elements cause difficulties when users first interact with the applications. For example, when new vocabulary is used throughout menus, screens, and other aspects of an application a user will often not initially know a meaning of the new vocabulary. Similarly, new controls/features can cause a user to become confused. Consequently, the user relies on manuals, Internet searches, and other secondary means of information that are not part of the application to determine definitions and/or instructions. This hunt for help causes time inefficiencies and does not add to a collective knowledge base for all users that experience similar difficulties.

SUMMARY

In general, in one aspect this specification discloses an apparatus. The apparatus includes icon logic configured to generate, in response to detecting a selection of a page element, an icon that indicates whether contextual content associated with the page element is available. The page element is a display element of a graphical user interface (GUI) for an application. The apparatus includes context logic configured to generate a context panel in response to detecting an input associated with the icon. The context logic is configured to generate the context panel with a first tab and a second tab. The first tab includes a description of the page element and the second tab includes a set of comments from users about the page element.

In another embodiment, the context logic is configured to configure the page element to provide the contextual content by establishing one or more entries in a database for the page element and modifying the application by inserting a tag into the application that specifies the page element includes contextual content.

In another embodiment, the context logic is configured to modify, in response to receiving input within the context panel, the contextual content by adding the input to a database associated in a location that correlates with the page element. The input includes text. Modifying the contextual content is based, at least in part, on security privileges of a user that provided the input.

In another embodiment, the icon logic is configured to generate the icon for the page element by determining a status of the contextual content associated with the page element by querying a database to retrieve an indicator of the status.

In another embodiment, the context logic is configured to generate the context panel by populating the first tab and the second tab with information retrieved from an entry in a database associated with the page element.

In another embodiment, the icon logic is configured to generate the icon to indicate a status of the contextual content. The contextual content is help information associated with the page element.

In another embodiment, the page element is text or a graphic. The context logic is configured to generate the context panel in a popup window in front of the GUI. The set of comments are added to the contextual content by one or more users of the GUI.

In general, in another aspect, this specification discloses a method. The method includes generating, in response to detecting selection of a page element, an icon that indicates whether contextual content associated with the page element is available. The page element is a display element of a graphical user interface (GUI) for an application. The method includes generating, by at least a processor, a context panel in response to detecting an input associated with the icon. Generating the context panel includes generating a first tab and a second tab. The first tab includes a description of the page element and the second tab includes a set of comments from users about the page element.

In another embodiment, the method includes configuring the page element to provide the contextual content by establishing one or more entries in a database for the page element and modifying the application by inserting a tag into the application that specifies the page element includes contextual content.

In another embodiment, the method includes modifying, in response to receiving input within the context panel, the contextual content by adding the input to a correlating location in the database associated with the page element. The input includes text and modifying the contextual content is based, at least in part, on security privileges of a user that provided the input.

In another embodiment, generating the icon for the page element includes determining a status of the contextual content associated with the page element by querying a database to retrieve an indicator of the status.

In another embodiment, generating the context panel includes retrieving information from a database to populate the first tab and the second tab.

In another embodiment, the icon is generated to indicate a status of the contextual content.

In another embodiment, the page element is text or a graphic and the context panel is displayed in a popup window in front of the GUI. The set of comments are added to the contextual content by one or more users of the GUI.

In another embodiment, the selection of the page element is a mouseover event of the page element.

In general, in another aspect, this specification discloses a system. The system includes context logic configured to display contextual help content for a page element of an application by generating a context panel with a first tab and a second tab in a popup window. The first tab includes a description of the page element and the second tab includes a set of comments about the page element. The page element is text or a graphic that is in-line within a graphical user interface (GUI) of an application. The context logic is configured to modify the contextual help content by adding input received from a user to a location in a database associated with the page element.

In another embodiment, the system includes icon logic configured to display an icon in response to detecting selection of the page element.

In another embodiment, the icon logic generates the icon to indicate whether the contextual help content associated with the page element is available. The page element is a display element of a graphical user interface (GUI) for an application.

In another embodiment, the input includes text and the context logic is configured to modify the contextual help content based, at least in part, on security privileges of a user that provided the input.

In another embodiment, the context logic is configured to generate the context panel based, at least in part, on security privileges of a user that is requesting the context panel.

BRIEF DESCRIPTION OF THE DRAWINGS

The accompanying drawings, which are incorporated in and constitute a part of the specification, illustrate various systems, methods, and other embodiments of the disclosure. Illustrated element boundaries (e.g., boxes, groups of boxes, or other shapes) in the figures represent one example of the boundaries. In some examples, one element may be designed as multiple elements or multiple elements may be designed as one element. In some examples, an element shown as an internal component of another element may be implemented as an external component and vice versa.

DETAILED DESCRIPTION

Described herein are examples of systems, methods, and other embodiments associated with providing contextual notes/help along with elements within an application. Consider that distractions from a user's workflow can lead to reduced productivity. Further consider that distractions can include simple events such as the user not understanding a term, not knowing how to control an element of an application and so on. Thus, in general, a user will turn to an out-of-band resource (e.g., dictionary, instruction manual, or other source that is separate from the application) upon encountering an unknown term or other element within the application. Consequently, the user and others that encounter similar difficulties may suffer from reduced productivity.

Figure 1:
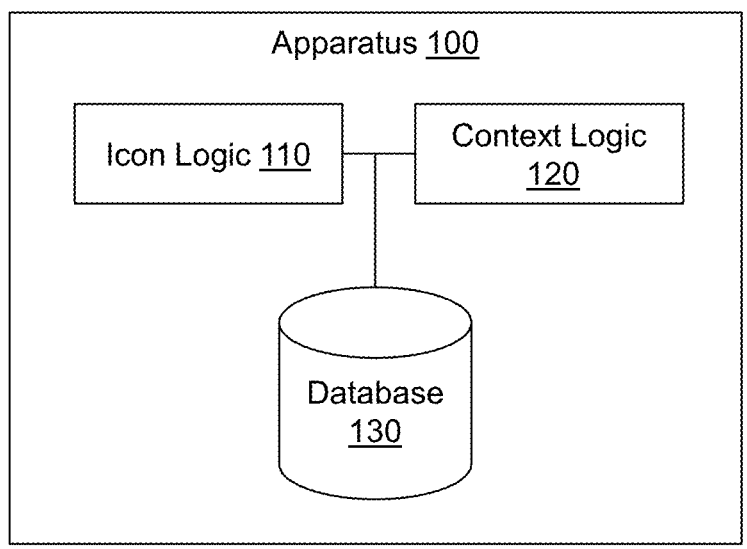
FIG. 1 illustrates one embodiment of an apparatus associated with providing contextual content along with elements within an application.

Accordingly, in one embodiment, contextual notes/help are provided in-line within an application so that users can obtain information about terms and other features from within the application without using ancillary sources. With reference to FIG. 1, one embodiment of an apparatus 100 is shown that is associated with providing contextual notes along with elements within an application. In one embodiment, the apparatus 100 includes icon logic 110, context logic 120, and a database 130. The apparatus 100 may be implemented in a computer such as a server or other device that serves web applications (e.g., asp.net, Java, etc.) to users in a client/server environment. In another embodiment, the apparatus 100 is implemented within a personal computer such as a laptop or desktop device, or other type of computing device (e.g., handheld device).

In general, the apparatus 100 modifies an application (e.g., a web-based application) to include help/notes/comments in order to provide users with resources in-line within the application for understanding elements of the application. That is, for example, the apparatus 100 provides pluggable web-based context help within the application.

For example, the context logic 120 is configured to modify or configure elements within pages of the application to provide access to the contextual content (i.e., help and notes). Consider that the application is, for example, a web-based application that includes a plurality of different pages or screens. The pages/screens are a graphical user interface (GUI) used by a user to interact with the application. The pages/screens of the application include various text, controls, graphics, input fields and so on for use by users to interact with the application. Accordingly, the context logic 120 is configured to modify or otherwise configure page elements in the application to provide contextual content.

For example, the context logic 120 exposes functions to a user that permit the user to edit page elements so that the page elements provide the contextual content. The user is, for example, a system administrator or other user with security privileges which permit the user to modify page elements. In general, the user configures the page elements by adding a tag (e.g., HTML tag) within program code of the application. Additionally, the context logic 120 establishes one or more entries in the database 130 for the page element to store contextual content associated with the page element.

In one embodiment, the database 130 is a relational database query management system (RDBMS) database implemented using, for example, Structured Query Language (SQL) server. The database 130 may also be text-based or XML-based. In general, the database 130 is a storage medium or memory device that is configured to store contextual content and other information for providing context panels within an application. In this way, the context logic 120 configures page elements to provide the contextual content and stores the contextual content for subsequent uses.

For example, the icon logic 110 is configured to indicate to a user when information (e.g., help/notes/comments) is available for a specific page element within the application. In one embodiment, the icon logic 110 generates and displays an icon upon detecting a selection of the specific page element. The icons will be discussed in greater detail with reference to FIGS. 2 and 3.

However, in general, when a page element (e.g., a term or phrase) has been previously configured using the context logic 120, a user can mouseover the page element and the icon logic 110 causes an icon to be displayed next to the page element. In one embodiment, the icon logic 110 generates and displays the icon to indicate a status of contextual content related to the page element. That is, if the contextual content includes user comments then the icon indicates the presence of the user comments, if the contextual content is incomplete and does not include any information, then the icon indicates the absence of information, and so on. In this way, a quick indicator is provided to a user in order to inform the user of the availability of the contextual content.

Furthermore, the context logic 120 provides access to the contextual content by using the icon as a control. For example, the context logic 120 is configured to generate and display a context panel in response to a user selecting the icon produced by the icon logic 110. The context panel will be discussed in greater detail with reference to FIGS. 2 and 4-5. However, in general, the context logic 120 generates the context panel as a popup window or popup graphic user interface (GUI) within the GUI of the application. The popup window/GUI of the context panel is, for example, displayed in front of a primary window for the application (i.e., GUI of the application) that includes the page element.

The context logic 120, in general, generates the context panel with a description of the page element or instructions associated with the page element and user comments, if there are any. Accordingly, the context panel includes useful information for understanding and/or discussing a page element associated with the context panel. Additionally, the context logic 120 is configured to modify contents of the context panel through input received via the context panel. In this way, the context panel can include dynamic content such as comments and/or updated descriptions and other information.

Figure 2:
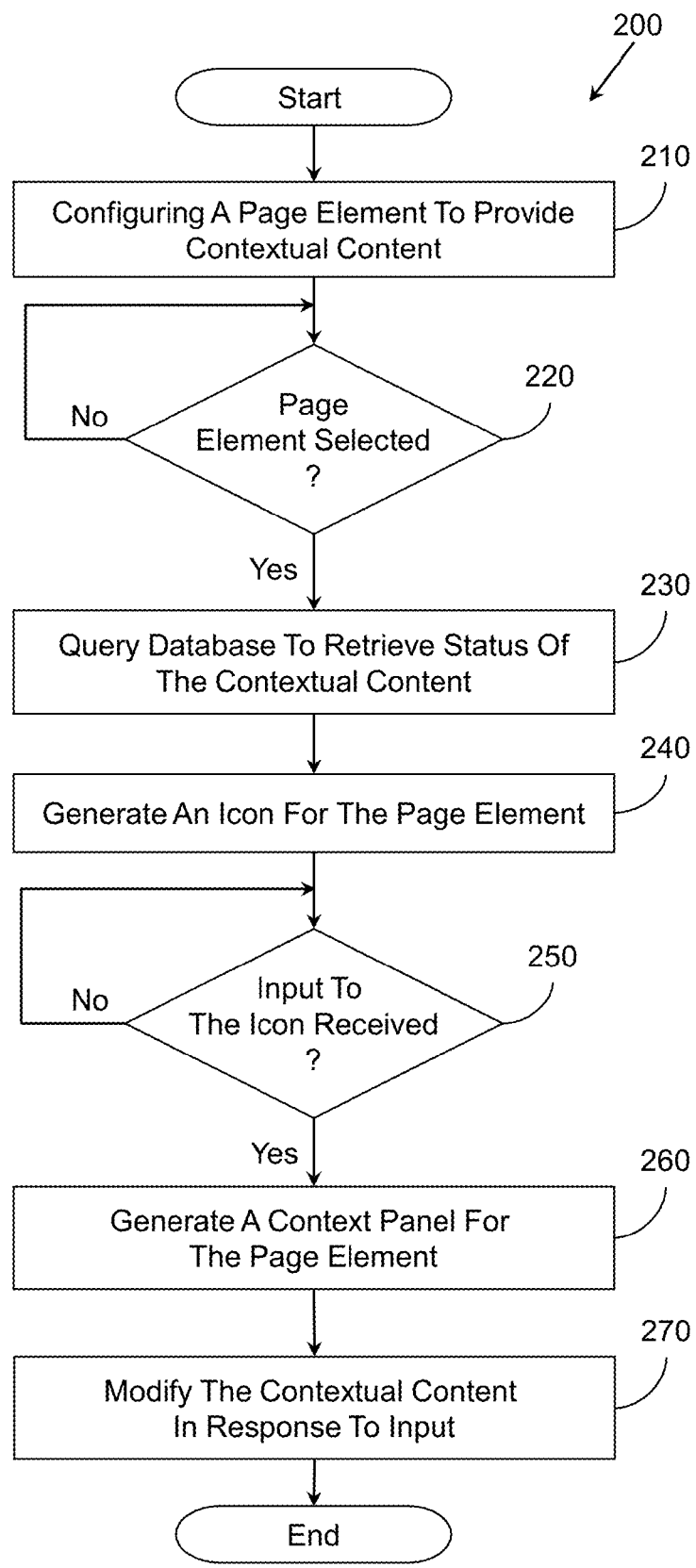
FIG. 2 illustrates one embodiment of a method associated with providing contextual content along with elements within an application.

Further details of generating and displaying the context panel will be discussed with reference to FIG. 2. FIG. 2 illustrates a method 200 associated with providing contextual content along with elements within an application. FIG. 2 will be discussed from the perspective of a computer that generates and displays the context panel. FIG. 2 will be discussed along with FIGS. 3-5, which illustrate various embodiments of icons and context panels associated with the method 200.

At 210 of method 200, the computer configures one or more page elements of an application to provide contextual content. For example, the computer exposes functionality to one or more users so that the users can select which elements on one or more pages of the application provide contextual content. That is, a system administrator or other user with appropriate security privileges can provide input to the computer that causes the computer to configure a page element within the application to provide contextual content.

In one embodiment, the computer establishes one or more entries in a database for the page element to configure the page element to provide contextual content. The computer may also add a tag (e.g., HTML) or other reference by modifying program code of the application so that when the application is in use a user is made aware of availability of contextual content for the page element. In general, the page element is text (e.g., a word of phrase) or a graphic that is displayed as part of a graphical user interface (GUI) of the application. Accordingly, various elements within the application can be configured to include contextual content in-line within the application in order to improve availability of help information to users of the application.

At 220, the computer determines whether the page element has been selected. That is, for example, the computer determines whether a user has placed a mouse pointer over (i.e., mouseover) the page element or, more generally, selected the page element by highlighting, tabbing, or tapping on the page element to select the page element. The computer may continuously monitor for input that indicates a selection at block 220.

However, once input is detected, the computer proceeds to block 230. At 230, an icon that indicates availability of contextual content for the page element is generated. In one embodiment, the computer generates the icon according to a status of contextual content associated with the page element. Accordingly, the computer may query a database (e.g., the database 130) to determine an extent of the contextual content for the page element. That is, the computer may query the database to determine whether there are comments about the page element from other users, whether there is a description of the page element available, and so on. Alternatively, instead of querying the database to determine an extent of specific information, in another embodiment, the computer retrieves an indicator of the status that is updated whenever a change is made to the contextual data and stored along with the contextual data in the database. In either case, the computer determines the status prior to proceeding to block 240.

Figure 3:
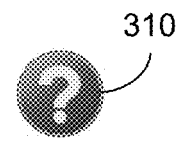
FIG. 3 illustrates various examples of icons associated with providing contextual content along with elements within an application.
Figure 3:
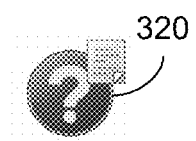
Figure 3:
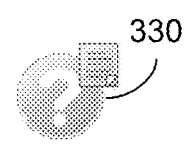
Figure 3:
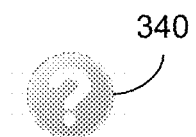

At 240, the icon is generated according to the status as determined at 230. Upon generating the icon, the computer then displays the icon in proximity to (e.g., next to) the page element to indicate to the user that contextual content associated with the page element is available. FIG. 3 illustrates examples of icons that may be generated at 240. For example, icon 310 is a green icon that indicates a description or instructions are available. The computer generates and displays the icon 310 when a description or instructions are available for the page element in the database but no comments are available. Icon 320 is a green icon that indicates comments and instructions/descriptions are available. Icon 330 is a gray icon that indicates only comments are available. Icon 340 is a gray icon that indicates no contextual content is available.

The icon 340 is generated and displayed for a page element to indicate to a user that, even though no content is available, content may be added by the user. While the icons 310-340 are discussed as being of certain colors and are shown as question marks enclosed within a circle, of course, in other embodiments, icons generated and displayed for page elements may be different colors, shapes, and include different text depending on a specific implementation. However, in general, an icon is displayed as an indicator so that a user is aware of the presence of contextual help content.

In one embodiment, depending on security privileges of a user (e.g., administrator, moderator, basic user, etc.) the user can add content to a content panel. Modifying the context panel by adding content will be discussed in greater detail with block 270. However, in general, the icon 340 is displayed so that the user can add content even if there is presently no contextual content available for the page element. If the user is an administrator or other privileged user, then the user can add both description/instruction information and comments. However, if the user is not a privileged user, then only comments may be added. Accordingly, the icons 310-340 are generated and displayed at 240 to indicate to a user the status of available contextual content.

At 250, the computer determines whether an input associated with the icon has been received. That is, for example, the computer determines whether a user has clicked the icon or, more generally, selected the icon in order to cause the context panel to be provided. The computer may continuously monitor for input that indicates an input at block 250.

However, once input is detected, the computer proceeds to block 260. At 260, the computer generates and then displays a context panel for the page element. In one embodiment, the computer generates the context panel with a first tab and a second tab. For example, the computer retrieves the contextual content from the database and populates the first tab with a description of the page element or instructions regarding the page element. The second tab is populated with a set of user comments from the contextual comments.

Figure 4:
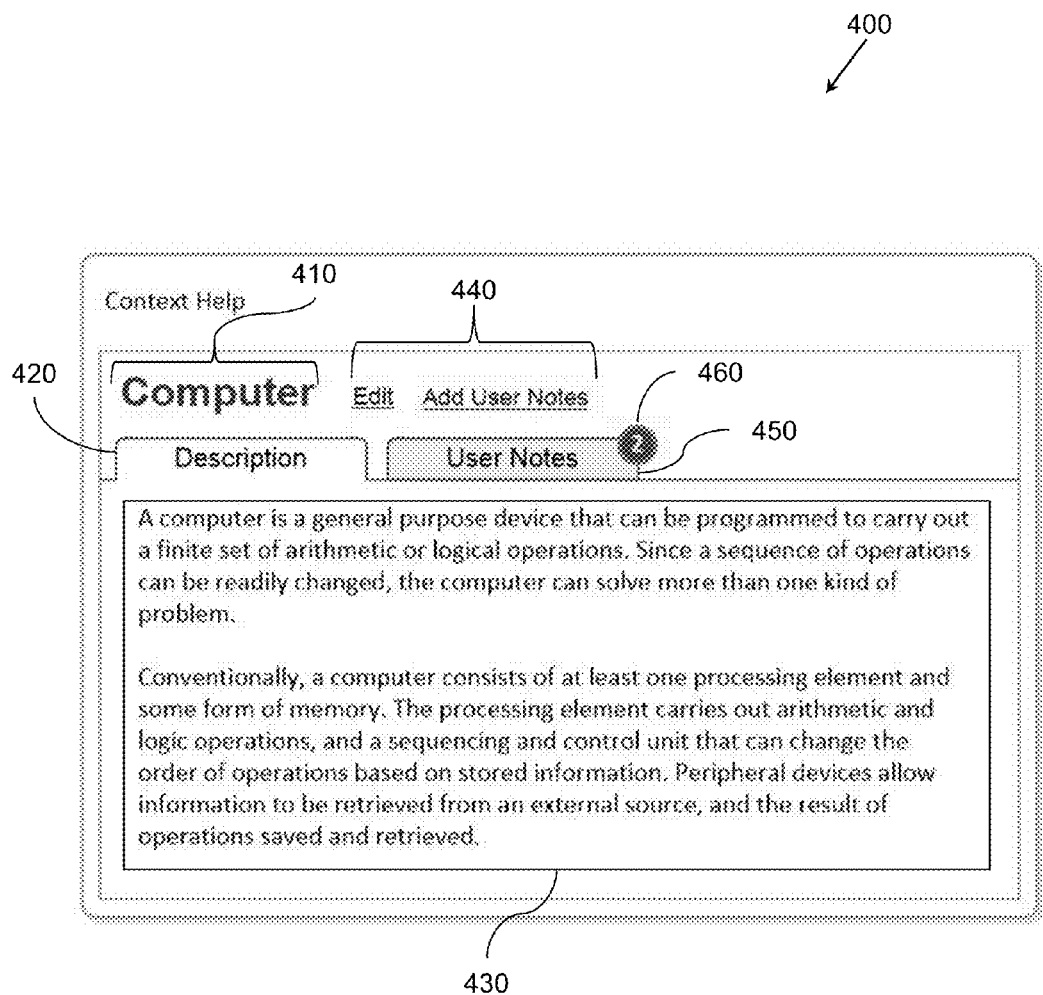
FIG. 4 illustrates one embodiment of a context panel associated with providing contextual content along with elements within an application.

FIG. 4 illustrates one embodiment of a context panel 400 associated with method 200. The context panel 400 is associated with a page element 410 that is the term "computer." That is, the page element 410 is the term "computer." Accordingly, at 210 of method 200, the term "computer" was configured to have contextual content. Subsequently, when a user clicks an icon for the term computer as displayed in-line with the application, the context panel 400 is generated and displayed, at 260. The context panel 400 includes the page element 410 along with a first tab 420 labeled "Description." The first tab 420 includes a description for the page element in a content pane 430. While the first tab 420 is shown with a description of the page element, of course, in other embodiments, the first tab 420 includes instructions or other information in the content pane 430 that is useful to a user for understanding the page element 410.

The context panel 400 also includes an editing menu 440. Further details of the editing menu will be discussed subsequently in relation to block 270. However, in general, the editing menu 440 includes tools and buttons for editing content of the content pane 430 for both the first tab 420 and a second tab 450. Furthermore, in one embodiment, the context panel 400 and the editing menu 440 may be generated with fewer or more options depending on security privileges of a user that is interacting with the context panel 400. That is, an administrator would be presented with a context panel 400 that includes a complete set of buttons and tools for editing entries in the tabs 420 and 450. Conversely, a standard user would have access to only basic editing buttons and tools within the second tab 450 for adding and editing their own comments.

Figure 5:
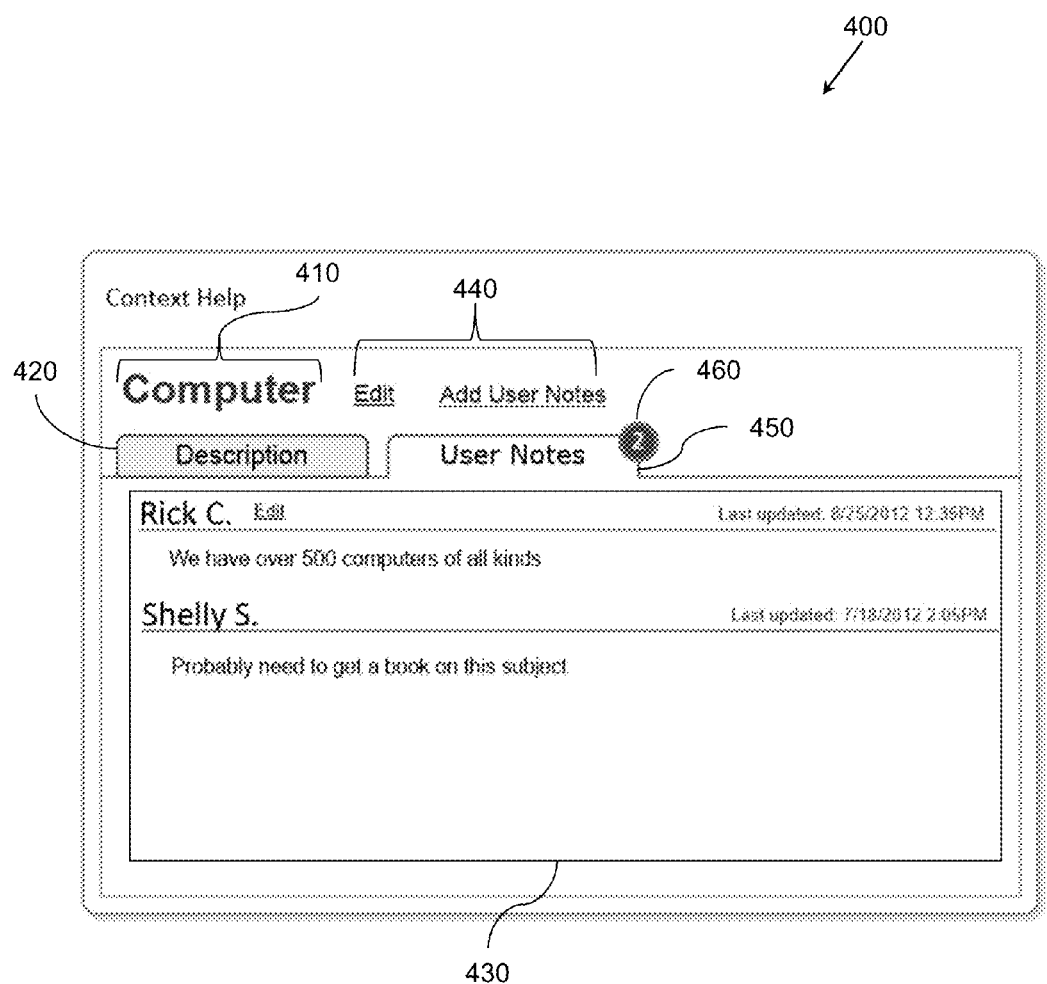
FIG. 5 illustrates one embodiment of a context panel associated with providing contextual content along with elements within an application.

With reference to FIG. 5, an additional view of the context panel 400 is shown with the second tab 450 selected. When the second tab 450 is selected the content pane 430 displays user notes or comments associated with the page element 410. An indicator 460 displays a number of comments that have been logged for the page element 410. The second tab 450 provides dynamic content in that additional notes may be added to the set of comments in the second tab 450 as a discussion of the page element 410 progresses over time. In this way, users contribute to a collective knowledge-base that helps a community of users understand the page element 410.

While the context panel 400 has been discussed as including two tabs, of course, in other embodiments, the context panel 400 may include fewer or more tabs than shown. For example, the context panel 400 may include additional tabs for different discussions about the page element 410, additional tabs that indicate updates to the page element 410, and so on.

Continuing with method 200, at 270, content within the content pane 430 is modified upon receiving input from a user. As previously discussed, at 240, users may have different security privileges. Accordingly, depending on security privileges for a user (e.g., whether a user is an administrator or basic user), the user can edit and/or add different content in a context panel. For example, a user with administrator privileges can edit content of the first tab 420 and content within the second tab 450. However, a user with basic privileges can only add comments to the second tab 450. Additionally, the input to the context panel includes, for example, text or other data and is added to a correlating location in the database associated with the page element. In this way, the computer provides context panels for page elements with dynamic content and maintains all information for a context panel together within a database structure.

Figure 6:
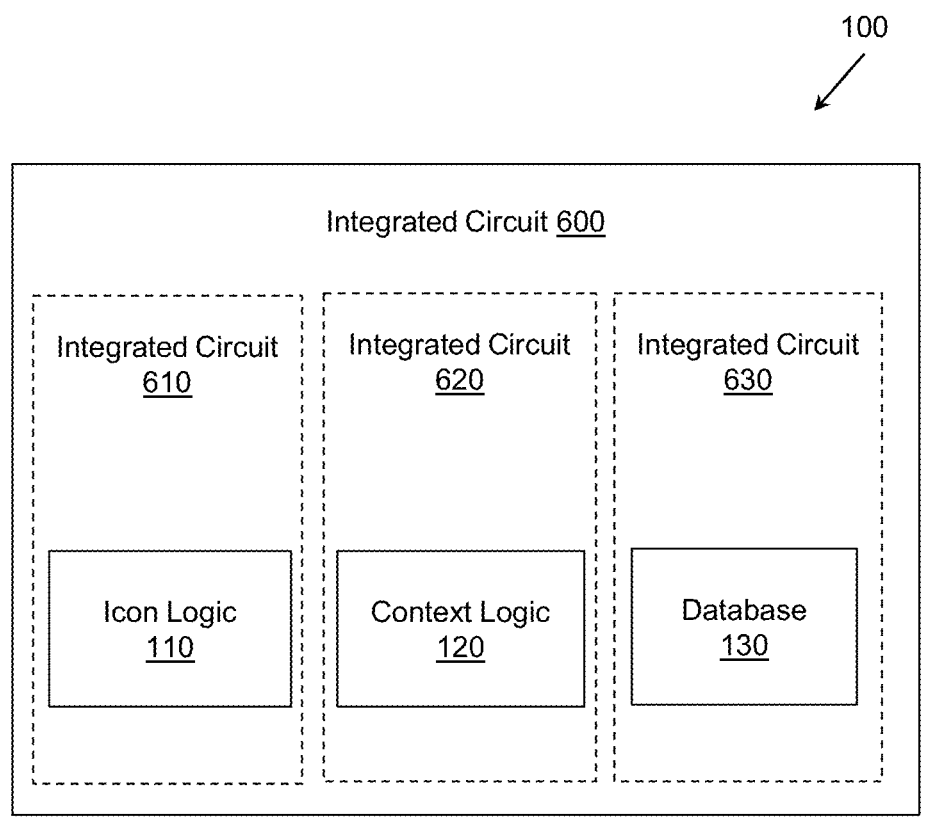
FIG. 6 illustrates one embodiment of an integrated circuit associated with providing contextual content along with elements within an application.

FIG. 6 illustrates an additional embodiment of the apparatus 100 from FIG. 1 that is configured with separate integrated circuits and/or chips. In this embodiment, the icon logic 110 from FIG. 1 is embodied as a separate integrated circuit 610. Additionally, the context logic 120 is embodied on an individual integrated circuit 620. The database 130 is also embodied on an individual integrated circuit 630 or memory device. The circuits are connected via connection paths to communicate signals. While integrated circuits 610, 620, and 630 are illustrated as separate integrated circuits, they may be integrated into a common integrated circuit board 600. Additionally, integrated circuits 610, 620, and 630 may be combined into fewer integrated circuits or divided into more integrated circuits than illustrated. In another embodiment, the icon logic 110, the context logic 120, and the database 130 (which are illustrated in integrated circuits 610, 620, and 630, respectively) may be combined into a separate application-specific integrated circuit. In other embodiments, portions of the functionality associated with the icon logic 110 and the context logic 120 may be embodied as firmware executable by a processor and stored in a non-transitory memory.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Logic", as used herein, includes a computer or electrical hardware component(s), firmware, a non-transitory computer readable medium that stores instructions, and/or combinations of these components configured to perform a function(s) or an action(s), and/or to cause a function or action from another logic, method, and/or system. Logic may include a microprocessor controlled by an algorithm to perform one or more of the disclosed functions/methods, a discrete logic (e.g., ASIC), an analog circuit, a digital circuit, a programmed logic device, a memory device containing instructions, and so on. Logic may include one or more gates, combinations of gates, or other circuit components. Where multiple logics are described, it may be possible to incorporate the multiple logics into one physical logic component. Similarly, where a single logic component is described, it may be possible to distribute that single logic component between multiple physical logic components. In some embodiments, one or more of the components and functions described herein are implemented using one or more of the logic components. Logic as described herein is limited to statutory subject matter under 35 U.S.C §101.

While for purposes of simplicity of explanation, illustrated methodologies are shown and described as a series of blocks. The methodologies are not limited by the order of the blocks as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional, not illustrated blocks. The methods described herein are limited to statutory subject matter under 35 U.S.C §101.

To the extent that the term "includes" or "including" is employed in the detailed description or the claims, it is intended to be inclusive in a manner similar to the term "comprising" as that term is interpreted when employed as a transitional word in a claim.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the disclosure is not limited to the specific details, the representative apparatus, and illustrative examples shown and described. Thus, this application is intended to embrace alterations, modifications, and variations that fall within the scope of the appended claims.

What is claimed is:

1. An apparatus, comprising:
    icon logic configured to generate, in response to detecting a user selection of a page element on a display screen, an icon that indicates whether contextual content associated with the page element is available, wherein the page element is a display element of a graphical user interface (GUI) for an application that is textual content or a control function of the application, wherein the icon logic is configured to select the icon for generation, from amongst a plurality of icons, based upon a combination of (i) a determination of whether a description is available for the page element, and (ii) a determination of whether a set of comments submitted by users are available for the page element; and
    context logic configured to generate and display a context panel in response to detecting an input associated with the icon, wherein the context logic is configured to generate the context panel with a first tab and a second tab, and wherein the context panel is displayed in a popup window visually in front of the GUI,
    wherein the context logic is further configured to, responsive to (a) the description being available for the page element and (b) the comments being available for the page element, (i) generate and transmit a first query to a first database to retrieve the description for the page element, and (ii) generate and transmit a second query to a second database to retrieve the set of comments associated with the page element,
    wherein the first tab is populated to include the description of the page element retrieved from the first database, and wherein the second tab is populated to include the set of comments associated with the page element retrieved from the second database,
    wherein the icon logic is configured to generate and display the context panel separate from a displayed page that includes the icon, and
    wherein the context logic is configured to dynamically modify the application by inserting a tag into program code of the application that when triggered by the input causes the context logic to generate and display the context panel.

2. The apparatus of claim 1, wherein the icon logic is configured to select a color for the icon, from amongst a plurality of colors, based upon the combination of (i) the determination of whether the description is available for the page element, and (ii) the determination of whether the set of comments are available for the page element.

3. The apparatus of claim 1, wherein the context logic is configured to modify, in response to receiving input within the context panel, the contextual content by adding the input to the first database in a location that correlates with the page element, and wherein the context logic is configured to generate the context panel with the contextual content to provide crowd sourced contextual content in-line within the application.

4. The apparatus of claim 1, wherein the icon logic is configured to generate the icon for the page element by determining a status of the contextual content associated with the page element by querying the first database to retrieve an indicator of the status.

5. The apparatus of claim 1, wherein the icon logic is configured to generate the icon to indicate a status of the contextual content, and wherein the contextual content is help information associated with the page element.

6. The apparatus of claim 1, wherein the page element is text or a graphic.

7. A method, comprising:
    generating, in response to detecting selection of a page element on a display screen, an icon that indicates whether contextual content associated with the page element is available, wherein the page element is a display element of a graphical user interface (GUI) for an application that is textual content or a control function of the application, wherein the icon is selected for generation, from amongst a plurality of icons, based upon a combination of (i) a determination of whether a description is available for the page element, and (ii) a determination of whether a set of comments submitted by users are available for the page element;
    generating and displaying, by at least a processor, a context panel in response to detecting an input associated with the icon, wherein generating the context panel includes generating a first tab and a second tab, and wherein the context panel is displayed in a popup window visually in front of the GUI on the display screen,
    responsive to the description being available for the page element, generating and transmitting a first query to a first database to retrieve the description for the page element,
    responsive to the set of comments being available for the page element, generating and transmitting a second query to a second database to retrieve the set of comments associated with the page element,
    populating the first tab to include the description of the page element retrieved from the first database, and populating the second tab to include the set of comments associated with the page element retrieved from the second database, and wherein generating the context panel includes generating the context panel separate from a displayed page that includes the icon, and dynamically modifying, by at least the processor, the application by inserting a tag program code of the application that when triggered by the input causes the context panel to be generated and displayed on the display screen.

8. The method of claim 7, wherein generating the icon includes selecting a color for the icon, from amongst a plurality of colors, based upon the combination of (i) the determination of whether the description is available for the page element, and (ii) the determination of whether the set of comments are available for the page element.

9. The method of claim 7, further comprising:

modifying, in response to receiving input within the context panel, the contextual content by adding the input to a location in the first database that correlates with the page element, and wherein generate the context panel with the contextual content provides crowd sourced contextual content in-line within the application.

10. The method of claim 7, wherein generating the icon for the page element includes determining a status of the contextual content associated with the page element by querying the first database to retrieve an indicator of the status.

11. The method of claim 7, wherein generating the context panel includes retrieving information from at least the first database and the second database to populate the first tab and the second tab.

12. The method of claim 7, wherein the icon is generated to indicate a status of the contextual content.

13. The method of claim 7, wherein the page element is text or a graphic.

14. The method of claim 7, wherein the selection of the page element is a mouseover event of the page element.

15. A system comprising:

context logic configured to display contextual help content for a page element of an application by generating a context panel with a first tab and a second tab in a popup window on a display screen, wherein the context logic is further configured to, responsive to (a) a description being available for the page element and (b) a set of comments submitted by users being available for the page element, (i) generate and transmit a first query to a first database to retrieve the description for the page element, and (ii) generate and transmit a second query to a second database to retrieve the set of comments associated with the page element, wherein the first tab is populated to include the description of the page element and wherein the second tab is populated to include the set of comments associated with the page element retrieved from the second database, wherein the page element is in-line within a graphical user interface (GUI) of the application and is textual content or a control function of the application, wherein the context logic is configured to dynamically modify the application by inserting a tag into program code of the application that when triggered by a selection causes the context logic to generate and display the context panel, wherein the context logic is configured to dynamically modify the application according to a user input by (i) establishing one or more entries in a database for the contextual help content of the page element and (ii) configuring the application with the tag to invoke the context logic to generate the context panel upon detecting the selection; and icon logic configured to display an icon in response to detecting the selection of the page element, wherein the icon logic is configured to select the icon for display, from amongst a plurality of icons, based upon a combination of (i) a determination of whether the description is available for the page element, and (ii) a determination of whether the set of comments are available for the page element.

16. The system of claim 15, wherein the icon logic is configured to select a color for the icon, from amongst a plurality of colors, based upon the combination of (i) the determination of whether the description is available for the page element, and (ii) the determination of whether the set of comments are available for the page element.

17. The system of claim 15, wherein the user input includes text and wherein the context logic is configured to modify the contextual help content based, at least in part, on security privileges of a user that provided the user input, and wherein the context logic is configured to generate the context panel with the contextual help content to provide crowd sourced contextual content in-line within the application.

18. The system of claim 15, wherein the context logic is configured to generate the context panel based, at least in part, on security privileges of a user that is requesting the context panel.

* * * * *